(12) United States Patent
Farkas et al.

(10) Patent No.: US 7,571,069 B1
(45) Date of Patent: Aug. 4, 2009

(54) DATA ASSURANCE WORKFLOW DERIVATION AND EXECUTION

(75) Inventors: Keith Istyan Farkas, San Carlos, CA (US); Sandro Rafaeli, Porto Alegre-RS (BR); Martin Fraser Arlitt, Calgary (CA); Subramoniam N. Iyer, Newark, CA (US); Amit Singh Rathore, Madhya Pradesh (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 126 days.

(21) Appl. No.: 11/644,168

(22) Filed: Dec. 22, 2006

(51) Int. Cl.
*G06F 11/00* (2006.01)
*G06F 11/08* (2006.01)

(52) U.S. Cl. .................. 702/120; 702/119; 702/186; 717/124

(58) Field of Classification Search .......... 702/120, 702/119, 186

See application file for complete search history.

(56) References Cited

U.S. PATENT DOCUMENTS

2006/0155738 A1* 7/2006 Baldwin et al. ............. 707/101
2008/0027961 A1* 1/2008 Arlitt et al. ................. 707/101

OTHER PUBLICATIONS

Gates et al., "JavaMaC and runtime monitoring for geoinformatics grid services", 2005, Proceedings of the 10th IEEE International Workshop on Object-Oriented Real-Time Dependable Systems (WORDS'05), 8 pages.*

* cited by examiner

*Primary Examiner*—Hal D Wachsman

(57) ABSTRACT

A method for providing data assurance includes receiving selected input data to perform data assurance thereon, and receiving selected parameters for the data assurance. Data assurance modules are provided that translate the input data and the parameters and that derive a workflow for the data assurance based on the translated input data and the parameters. The workflow is executed to provide the data assurance on the input data.

20 Claims, 10 Drawing Sheets

500

DATA ASSURANCE WORKFLOW DERIVATION AND EXECUTION

BACKGROUND

More and more organizations are interested in management and infrastructure services, such as automated control systems and analysis and health-monitoring tools, for accelerated or automated decision making. These services require monitored data (or collected data) about the utilization and behavior of the computing environments, that is, monitored data about the implemented information technology (IT) infrastructures. As referred herein, and as understood in the art, information technology, or IT, encompasses all forms of technology, including but not limited to the design, development, installation, and implementation of hardware and software information systems and software applications, used to create, store, exchange and utilize information in its various forms including but not limited to business data, conversations, still images, motion pictures and multimedia presentations technology and with the design, development, installation, and implementation of information systems and applications.

IT monitored data (hereinafter, "monitored data"), includes traditional system measurements or metrics (e.g., CPU utilization, memory utilization), application information (e.g., Web server logs, transactions per second), and environmental information (e.g., power utilization, data center temperature, data center humidity). As referred herein, a metric is any quantity that can be measured about a particular environment, such as an IT infrastructure. Numerous different types of metrics exist. Some metrics are specific to individual system components, such as the utilization of each individual CPU, or of the bandwidth used on a particular network interface. Thus, as also referred herein, monitored data includes measured values about one or more metrics, such as IT metrics. For example, monitored data may include metrics that reflect how specific processes or applications use these components. Other metrics summarize the behavior of an entire category of components, such as the average utilization of all CPUs in the system, or the aggregate input/output (I/O) rate across all disks.

Accordingly, monitored data may be used in automation tools for resource allocation, server consolidation, capacity planning, event correlation analysis, and closed-loop control to improve the accuracy of automated decision making processes employed in such tools. For example, to automatically and dynamically reallocate IT resources in an IT infrastructure to applications to meet business objectives, a resource allocation and capacity planning tool must base its automated resource allocation decisions (such as automatically providing additional resources to satisfy increased demands) on monitored data that reflects the use and behavior of the IT infrastructure. This is because capacity planners seek to ensure that the additional resources are available "just in time." If the resources are purchased too soon, costs are incurred that could have been delayed. On the other hand, if the resources are not acquired in time, revenues may be lost due to the impact on business processes. In another example, to reduce management and license costs by merging workloads from underutilized systems onto a smaller number of systems, a server consolidation must also base its automated server consolidation decisions on IT data collected from existing systems. The monitored data allows the server consolidation tool to automatically perform an analysis of these systems and make decisions on the consolidation of the workloads onto a smaller set of servers. Basing the automated server consolidation decisions on an analysis of empirical data not only enables better and more accurate decisions, but also allows for customization of such decisions for each particular IT infrastructure or environment. It should be understood that discussions of IT data herein are also applicable to other types of data.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
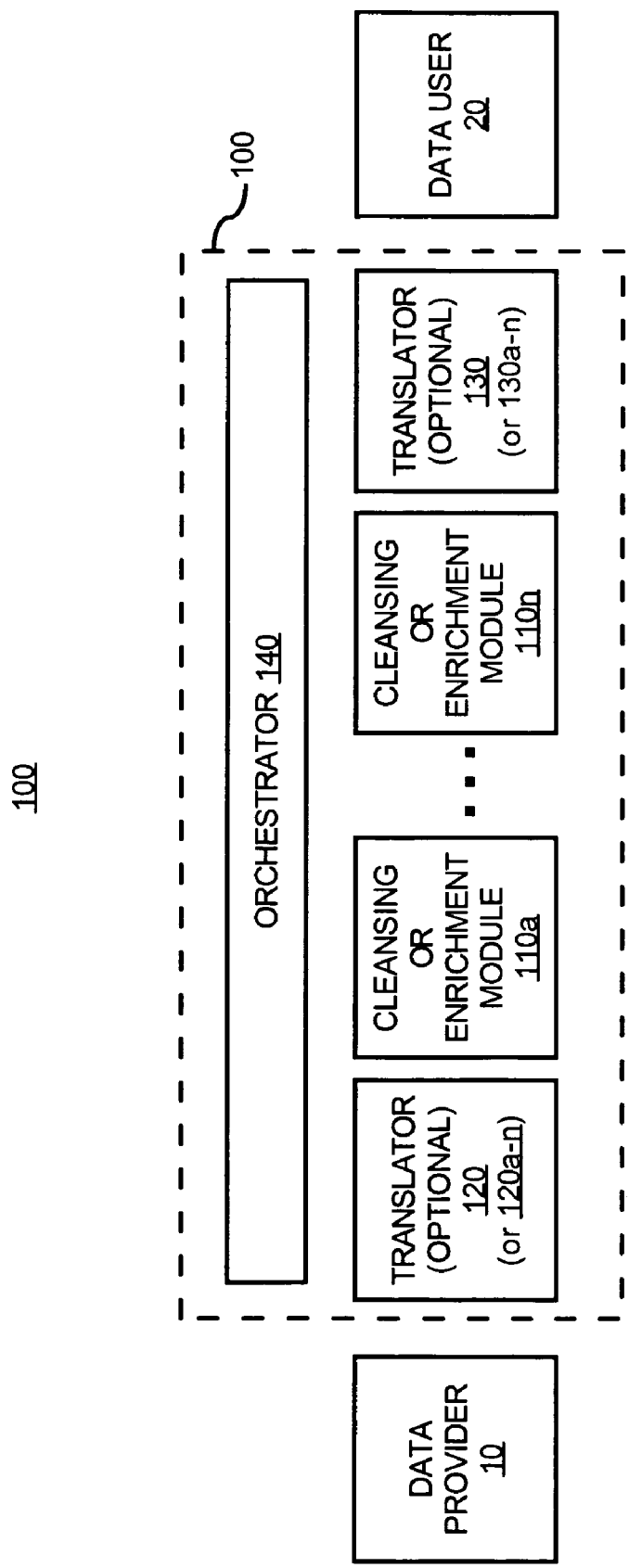
FIG. 1 illustrates a high-level architecture for a data assurance layer, in accordance with one embodiment of the present invention.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Due to software errors and complexity, monitored data of IT infrastructures often contains imperfections that can skew the results of any process or tool that subsequently relies on such data for its operations. As referred herein, a data imperfection is a "blemish" in the data that loses or otherwise obfuscates details of a monitored system's behavior. Examples of data imperfections include but are not limited to missing, extra, or duplicate data values, inconsistent or incorrect data values, data formatting imperfections (e.g., mismatched data types such as an integer is expected but a string was recorded), time alignment imperfections (e.g., caused by non-synchronized clocks). Typically, numerous different data imperfections coexist in a set of IT monitored data. Because poor quality data can lead to bad system planning, design, or operational decisions, imperfect data can undermine the robustness of any automated, data-driven management solution and erode the reliability of such a solution. Bad decisions also distract users from their business goals by introducing overhead and additional expense. Furthermore, too many bad decisions can reduce the willingness of system administrators or management to fully automate many tasks, which in turn can impact the perceived value of the management solution. Consequently, poor-quality monitored data hinders progress.

Ad-hoc techniques have been developed to deal with data quality problems, wherein point solutions to individual data imperfections are implemented. However, this approach may reduce the overall system robustness, limit the sharing of domain knowledge, and increase development and operational costs. There have also been a number of efforts to fix problems with the monitored data at the source by performing more frequent checks of the monitored data and building intelligence within the data collector. However, even after fixing all errors at the monitored source, monitored data may continue to be corrupted due problems in the environment such as network faults and data storage failures.

The dynamics of a current typical enterprise IT infrastructure complicate the task of identifying data imperfections, correcting the sources of the imperfections, and ensuring that such imperfections do not reoccur. The growing scale, adaptivity, and complexity of the infrastructure and the growing volume of data makes it increasingly difficult for humans to ensure that data is properly collected and to verify the validity of the monitored data in a timely manner. In addition, the growing complexity of IT infrastructures reduces the ability of humans to reason about the cause-and-effect relationships between components in the IT infrastructure and hence potentially leads to cascading failures following an initial bad decision. Furthermore, searching for imperfections in data is a very mundane task, and human skills are more efficiently focused elsewhere.

Accordingly, described herein are methods and systems that address at least the problems noted above by providing a data assurance layer that is situated in between the data collectors (or producers) and its end users or consumers. As referred herein, data users or consumers are either humans or tools, such as computer programs. For example, users may be IT consultants, IT managers, system administrators, or any other entities that are interested in the monitored data for use in automated decision making processes or any other process that desires data quality and assurance. In another example, a user may be a computer program or programs that assist end users that are humans by, for example, analyzing the data, reporting on trends, or taking automated actions based on the data.

According to various embodiments of the present invention, the data assurance layer provides a data assurance service or tool that allows data users to check for data imperfections and correct data imperfections that are found. A data assurance service or tool also may include a data-quality assessment that provides users with quantifiable measures of the data quality, such as reporting quantitative measures and indicators of data quality as annotations to the corrected or cleansed data and providing summary statistics of the data quality (e.g., the number of missing data rows, 95% of monitored data is correct, 5% of monitored data is corrupted). The data assurance layer captures best practice data assurance techniques, thus making these techniques readily available to all data users. Accordingly, the data assurance layer is operable to provide users with readily available data assurance techniques so as to free management tool developers from implementing point solutions to individual data imperfections, which can reduce the overall system robustness and limit the sharing of such developed solutions as noted earlier. Thus, as referred herein, data assurance includes evaluating the quality of data, correcting data imperfections, and providing data-quality assessments. The data assurance layer is further operable to provide users with readily available data enrichment techniques, such as deriving new system or performance metrics from existing ones, or to provide users with common data preprocessing functions. For simplicity, as referred herein, a data assurance layer, service, or tool provides data assurance services, data enrichment services, or both types of services.

Typically, the end users of monitored data use such data in different tools, such as automated resource allocation tools, server consolidation tools, and capacity management tools. Thus, data users may have different data assurance or enrichment needs. For example, one user may want to replace missing data points with interpolated values; whereas, another user may want to replace missing data points with zero or null values. These preferences may change according to the situation in which a given tool is being applied. Accordingly, in one embodiment, there is provided a data assurance layer that allows users of monitored data to customize the data assurance solution that best suit their specific needs. Thus, the data assurance layer provides a service or tool for the users to generate customization data assurance solutions. The data assurance layer may be composed of or developed from a set of customizable data assurance modules that are used to check for data imperfections, correct such imperfections, and assess data quality. As noted earlier, additional data-enrichment modules may be added to the data assurance layer in order to enrich the data, such as deriving new system or performance metrics from existing ones or computing summary statistics. Thus, the data assurance layer supports two classes of modules: data assurance modules and data enrichment modules. For simplicity, throughout the present disclosure both data assurance and data-enrichment modules are referred as "data modules" unless references are made to functionalities specific to one of these two module types. Accordingly, a data assurance layer or solution for a given data user may be constructed by composing these data modules into a workflow, specifying how data flows through the data modules in the workflow, and customizing the checking, correction, and enrichment functions. This composition is enabled by a novel data capturing and orchestration language that describes the required metadata, data flows, and customizations. The orchestration language provides predefined keywords and syntax for use, as further described below. As such, a data assurance solution is composed for a given use of monitoring data by programming the data modules and composing them together, creating a personalized solution using standard building blocks.

FIG. 1 illustrates a high-level architecture for a data assurance layer 100 that provides a data assurance tool or service to a data user 20, in accordance with one embodiment of the present invention. Although the data user block 20 is illustrated in FIG. 1, it should be understood that such a block represents one or more users as defined earlier, or one or more tools, such as resource allocation tools and capacity management tools, employed by one or more users that make use of the cleansed or enriched data for one or more desired purposes.

The data assurance layer 100 is logically situated between one or more data providers 10 and the data user 20 for checking and correcting imperfections and otherwise analyzing the quality of the collected data from the data provider 10 before such data is forwarded to the data user 20. The data provider 10 may be a data collector, a data producer, or a data monitoring tool. The logical location of the data assurance layer 100 should be distinguished from its physical location, which may be at any location so long as it provides data assurance of user-desired data prior to the delivery of such data to the user 20. The data assurance layer 100 is of a modular design and includes one or more data assurance or data-enrichment modules 110*a-n*. Each data module is customizable to implement or provide a class of functions, such as a class of data assurances (e.g., data-imperfection checks and corrections) and data enrichments. With data corrections, for example, the specific functions that may be applied for a given data imperfection depend on the data imperfection type and the preferences of the data user 20. Table 1 lists some sample imperfection types, the exemplary test that is done to detect each of them, and the correction that may be used when an instance of data imperfection is identified. The table also lists the requisite metadata for performing the noted tests or to correct for a discovered imperfection.

that computes data quality measures based on the occurrences of the imperfections identified by the previously listed modules. In one embodiment, data quality measures are computed by the individual modules as they execute the workflow and by the orchestrator 140 using the imperfection records each module produces as it executes. In another embodiment, these data quality measures are computed by a separate data assurance module. These measures are provided to the user along with the data as further described below.

In one embodiment, each data assurance module is operable to implement one of two sets of data assurance techniques, a rule-based set and a statistics-based set, for identifying and correcting data imperfections that are found during the checking or testing process. However, alternative embodiments are contemplated wherein other sets or types of data assurance techniques may be implemented by a data assurance model as well.

A rule-based data assurance module employs predetermined rules to test for violations, given properties of the monitored infrastructure and environment. For example, a rule may check if the value of a metric (e.g., CPU utilization) is within a given range. Another rule may check if the value of a metric (e.g., memory usage) is inconsistent with the moni-

TABLE 1

| Imperfection Type | Test | Required Metadata | Example Corrections |
|---|---|---|---|
| Formatting | Time stamp or metric value is valid? | Expected data types | Interpolate row |
| Formatting | Correct number of metric values? | Expected number of metrics | Reject row |
| Alignment | Time stamp aligned to expected time series? | Expected begin time and time step | Interpolation or rewriting |
| Alignment | Correct time zone conversions? | Source time zone, UTC offset, daylight saving time | Reject data row |
| Missing observations | Irregular time stamps? missing values? | Expected time series properties, number of metrics | Imputation or interpolation |
| Incorrect values | Value outside expected range for metric? | Set of acceptable values for metric | Set values to null |
| Incorrect values | $\sum_{i=1}^{n} \text{Mapplication}_i - \text{Msystem} \approx 0?$ | Relationships between metrics M | Interpolate values |

Examples of a possible data assurance module include but are not limited to: a correlation module for testing known relationships between metrics (e.g., the sum of the measured application metrics like CPU utilizations of multiple applications running on a system must equivalent to the measured global metric like the total CPU utilization of the system), a range test module for testing whether a metric is within a defined range, a time check module for testing whether the data points in a data set occur at the expected time intervals and whether conversions between time zones are correct, a missing/extra data module for testing whether there is missing or extra data in a data set, a statistical similarity module for testing whether a given data set is statistically similar to previously encountered data sets, and a data quality module tored environment from which the data was gathered (e.g., an application reportedly used 300 MB of memory, but the system only has 256 MB). The rules may be based on those rules that skilled data analysts would apply when manually inspecting the data. For example, rules for the rule-based data assurance modules may be identified and implemented by examining a number of data sets, frequently after a data user had complained about suspicious data or after one or more statistical modules consistently report abnormal behavior. Thus, any data user (human or tool) may systematically apply these rules across large volumes of data while customizing corrections and applying data enrichments. Consequently, the expertise of a small set of data analysts may be leveraged by a much larger number of users in a cost effective manner.

A statistics-based data assurance module employs statistical techniques to detect inconsistent behavior (e.g., a set of values exceeding the third standard deviation). For example, one statistical technique may use statistical data models to detect probabilistic outliers. Examples of statistical data models include but are not limited Auto Regressive model, Moving Average model, Auto Regressive Moving Average model, Generalized Auto Regressive Conditional Heteroskedasticity.

There are a number of approaches to correcting data imperfections that may be implemented in either a rule-based or statistics-based data assurance module. Rule-based corrections include, for example, deleting a data row or a data value, regenerating a row or a data value, setting a missing data value to NULL, or rewriting a time stamp, as illustrated in Table 1. In turn, to regenerate a row or a data value, for example, imputation (e.g., replace missing values of a metric with the mode of the metric's observed values, or set incorrect values to zero) and linear interpolation may be used. Statistics-based corrections include, for example, applying a given statistical data model, such one of the aforementioned models, for filling in missing values. It should be understood, that a rule-based or statistics-based data correction technique may be used for either a rule-based or statistics-based detection of data imperfections. Thus, data correction techniques may be subjective based on the users, who are expected to use these techniques in conjunction with data quality measures and individual data point metadata to make an informed decision about how to use the data.

In one embodiment, data assurance modules also generate metadata that may be used by the data user to assess the quality of the data, and hence, to determine the set of actions that should be taken using the data. For example, the data assurance modules may generate per-data-point metadata and global metadata. Per-data-point metadata describes, for each data imperfection found, the type of the found imperfection, any relevant context information, and the correction taken. For example, if a data value is found to be outside an expected range, the appropriate data assurance module will record that this issue occurred, the expected range of values, and what correction was taken. Global metadata describes, for each data set or subset of data, a summary of the per-data-point metadata and additional quality measures. For example, a data assurance module may compute the percentage of data values for which no problem was found. Thus, as noted earlier, a data assurance module may provide one or more of the following functions: data imperfection checks, data imperfection corrections, and data quality assessments.

Examples of a possible data-enrichment module include but are not limited to: a merge module for merging data sets (e.g., from multiple data providers) together; a statistics module for computing summary statistics for metrics (including minimum, maximum, average, mean, and selected percentile and values), a derivation module for deriving a new metric from an existing one (e.g., given CPU Utilization and Number of CPUs, compute CPUShares as CPU Utilization×Number of CPUs), and a projection module for projecting a data set forward in time or to modify the data set to account for anticipated change in data values, say due to growth in system usage.

In one embodiment, the data modules (both assurance and enrichment) are trace-file based. That is, they work by reading in a trace file, processing it according to the specified assurance/enrichment functions in their respective data modules, and output another trace file. The trace file also contains metadata about the data, including metric names, the time zone in which dates are expressed, and the begin and end date/times of the data in the trace. Thus, as referred herein, a trace file contains metrics, values of the metrics (metric data) and metadata about such metrics (metric metadata). The actions to be done by each module are captured in a separate file, called a task file. Accordingly, each module receives as input a trace file and a task file. Each module then outputs a trace file containing the metric data and associated metric metadata that have been processed by the module in accordance with its assurance or enrichment functions.

In one embodiment, the data modules work with data collected as a time series. That is, a set of metric values are collected over a time period, either at constant intervals or irregular intervals to form "traces" of data at each time interval. Thus, an input trace file contains a collection of one or more traces and metadata for metrics included in each trace. When structuring the data to be read by a module, the data is arranged in "rows" with each row having one or more metric values and one date/time stamp that defines the time series. There can be multiple date/times in a data row but only one can be used to define the time base for the data set. Each "column" of data has a unique name. The names are specified in the metadata at the head of each trace file using the data orchestration language. This metadata may also include additional information such as the data type for each metric (e.g., floating point, integer), the time zone for data/time metrics (e.g., Pacific Standard Time (PST)), and associations between metrics (e.g., metric A is the application CPU utilization while metric B is the global CPU utilization).

Referring back to FIG. 1, the data assurance layer 100 further includes optional data translator modules 120 and 130 and an orchestrator module 140. The data translator module 120 may represent multiple translator modules 120*a-n*, each for a unique type of data source (from the data provider 10) to convert the metric data from the data source into the aforementioned data orchestration language to capture such metric data. Each translator module 120 also provides metadata about the metrics provided by the data source, such as data types and defined ranges for values. For those users that are unable to read the data orchestration language, a second data translator module 130 may be used to transform the cleansed data from the data orchestration language to the format desired or required by the user 20. In this situation the metadata about the cleansed data may be shared with the users via, for example, a separate file or database table. Thus, like the data translator module 120, the data translator module 130 may represent multiple translator modules 130*a-n*, each for a user 20 that desires data translation. Accordingly, the data translator modules enable the data assurance layer 100 to work within any data collection infrastructure for which there are provided one or more corresponding data translator modules. This is because modifying input and output data for data assurance purposes for all data providers and users, and in particular, getting such entities to agree on a standard data format, is a daunting task.

In one embodiment, to invoke the data assurance service provided by the data assurance layer 100, the user may provide the monitored data (translated into the data orchestration language by the aforementioned translator module 120 as needed), and define or specify the data assurance or enrichment functions that are to be applied (as also translated by the translator module 120 as needed). Alternatively, another tool or the data assurance layer 100 itself may automate any one or more of these user tasks to obtain the monitored data and specifications. In one embodiment, the monitored data and specifications are captured in a file called a meta file (or any other name as desired), written in the aforementioned data orchestration language. The meta file provides a workflow therein for execution in the data assurance layer 100 to perform data assurance tasks.

Accordingly, as represented in the data orchestration language, the meta file typically contains metric definitions describing the metrics in the input data set(s), the input data set, and a section describing the work to be done by each data module 110 in the data assurance layer 100 that is part of the workflow contained in the meta file. Table 2 illustrates a sample meta file, broken down into components or sections, with workflow statements (represented in the data orchestration language) contained therein for the workflow, in accordance with one embodiment. As shown in Table 2, a workflow includes the following components in the following order: job settings, metric definitions (optional), one or more module sections, and one or more data file specification containing the data set to be cleansed/enriched. These components are programmed or described in the meta file in accordance with the predefined keywords and syntax of the data orchestration language. Hence, Table 2 is discussed below with reference to the employed data orchestration language.

TABLE 2

| | |
|---|---|
| Job Settings | <<output_filename_root>> test-string |
| | <<final_output_filename>> valid-file-name |
| Metric Definitions | <<metricdefns_start>> |
| | *metric_defn_PDT |
| | *metric_defn, NumCPUs |
| | <<metricdefns_end>> |
| Modules | <<module>> module-name_1 |
| | <<input>> data-set-name |
| | <<module_tasks_start>> |
| | <<module_tasks_end>> |
| | <<module>> module-name_2 |
| | <<input>> data-set-name |
| | <<module_tasks_start>> |
| | <<module_task_end>> |
| Data File | <<dataset>> data-set-name |
| Specification | <<filename>> name-of-file-containing-data-set |
| | (or name-of-file-containing-name-of-file-containing-data-set) |

In the Job Settings component, the workflow may specify attributes for the data assurance or enrichment processing that are to be used by the orchestrator 140 to process the workflow description. For example, Table 2 shows the attributes for specifying the name of the output file for the workflow and its root or path. The Metric Definitions component captures the metadata for the metrics that are contained in the input trace files for the first module to be executed. Thus, the metric definitions for the input data set may be captured in the workflow or in the header of the input data set. Also, each module, including the first one called, writes out the metric definitions for the metrics it generates. Hence, the metric definitions corresponding to the data generated by the first and subsequent modules are not explicitly captured in the meta file. Rather, they are derived from the metric definitions listed in the Metric Definitions component and optional information specified in each of the module sections. For the metric definitions, the data orchestration language is used to describe such information as the format of each data observation (e.g., time stamp format, number and type of metrics), the parameters of the expected time series (e.g., start time, time zone, interval length), the expected ranges for the metrics of interest, and the relationships between the metrics. In addition, the data orchestration language describes metadata about individual data points, such as whether the data point is null, whether it failed an imperfection test, and if so, what corrective action was taken.

In the module sections, the workflow defines the data modules that are to be executed and each module's customization of tasks using a set of four module workflow statements listed in order in Table 2. The task customizations for each module are contained between the two bracketed statements (that is, the last two workflow statements in the Module sections). The order in which the module sections are listed in the meta file defines the order in which they are to be called or executed. In other words, such an order indicates a dataflow of the trace files output from the data modules 110a-n. Each module section is written in the data orchestration language to include information specifying the metrics the associated module is to generate and the parameters that guide this process. Thus, for each module section, the data orchestration language describes such information as the tasks to be applied to each metric in a data set in the form of task statements (as would be written or programmed in between <<module_tasks_start>> and <<module_tasks_end>> in Table 2). For example, this information may direct the module to change the name of the output metric, to change its data type to floating point, or, as in the case of a range-check module, the bounds to be applied for the range check.

In the Data File Specification component, the workflow defines the input data set(s) that are to be processed by the workflow. The data from the input data set may be inserted here. Alternatively, the input data set may be contained in a data file that is called as is shown in Table 2 (<<filename>>). For this component, the data orchestration language is used to describe such information as the parameters of the input data set (e.g., start time, end time, time zone).

In one embodiment, the orchestrator 140 is employed to receive the meta file, as constructed by the user 20 or another tool such as the data assurance layer 100 itself, and parse the received meta file, e.g., by executing the bracketed (<< ... >>) workflow statements while disregarding the starred (* ... ) statements. From parsing the meta file, the orchestrator 140 creates the task files for each module (containing the task customizations listed in the Modules section of the meta file) and the input data file(s) for the first module in the workflow (which is the input data file listed in the Data File Specification component). It then calls each module in succession in accordance with the order of the Module sections in the meta file to execute the workflow. For output, the orchestrator 140 creates a result file containing the assured/enriched metric data and associated metadata (after workflow execution is completed), a warnings file in which it prints all the warnings generated by each module as part of the execution, a task file for each data module (from parsing the meta file) to perform during workflow execution, and the trace file written out by each module 110a. During workflow execution, the trace file output from one data module is automatically input to the next data module in the workflow, in accordance with the order in which the Modules sections are arranged in the meta file. The warnings file includes a description of the data imperfections found by all modules, listed in the order the modules are called. This information also may be encoded in the trace file output by each of the modules by including in the tasks of each module a statement that enables metadata flags. For example, a user may turn on the flags that will record the type of imperfection found for any data point found to be imperfect and the correction applied. Row level flags are generated by rolling up the flags for each metric in the row. The orchestrator 140 also retains all files that it has created so that the user may debug any problems.

Figure 2:
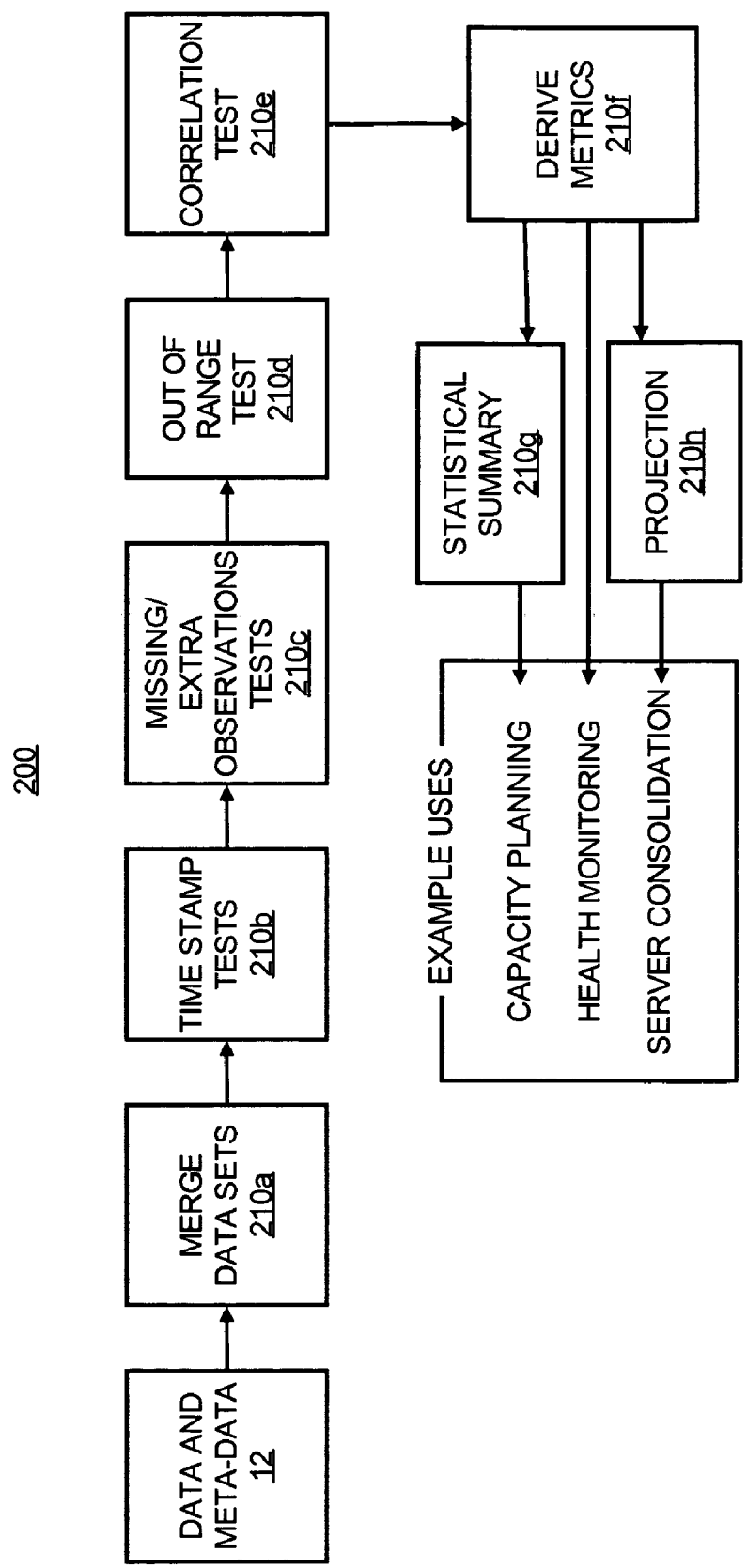
FIG. 2 illustrates an example of a workflow template, as imposed on a data assurance layer, in accordance with one embodiment of the present invention.

FIG. 2 illustrates an example of a workflow template 200, as imposed on a data assurance layer, that may be customized for one of three data uses: capacity planning in which summary statistics are desired, health monitoring in which the individual data points are desired, and server consolidation in which the individual data points are modulated to take into account anticipated growth in computing needs. In other words, multiple users may use the same or similar IT data for different purposes. A user may customize the template 200 to meet one or more specific needs, such as specifying what data corrections should be taken when missing data is found. This customized template is then fed to the data assurance layer when the user desires to process a given data set. Accordingly, the template 200 simplifies the process of developing a data assurance solution by providing the user with a framework to develop a workflow (rather than having to create a workflow from scratch). The workflow template 200 includes a plurality of data modules 210*a-h* of an underlying data assurance layer that correspond with the data modules 110*a-n* shown in FIG. 1. As exemplified, modules 210*b-e* are data assurance modules, and modules 210*a* and 210*f-h* are data enrichment modules. The data and metadata block 12 represents one or more input data sets collected from, for example, a data provider 10 shown in FIG. 1 that has been translated by the translator 120 into the data orchestration language for inclusion in a meta file. In one example, because the rules (for rule-based techniques) or statistics (for statistic-based techniques) are the same across all of the data, the checking specifications in the data assurance modules may be re-used for different purposes. However, the types of data corrections in the data assurance modules may vary. Thus, the modular design of the data assurance layer 200 allows the data user to simply interchange different data assurance modules or adjust input parameters for each in order to support different correction specifications.

Figure 3:
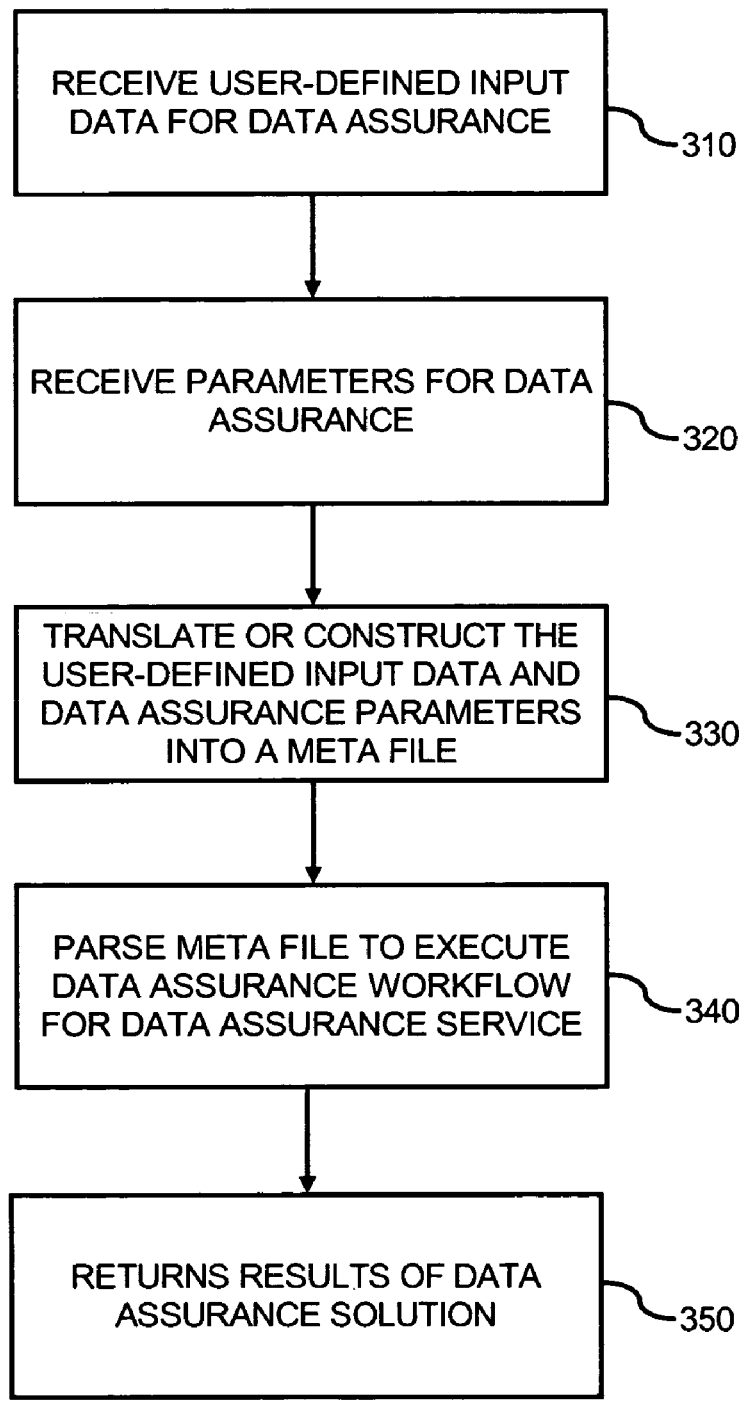
FIG. 3 illustrates a process for constructing and using a data assurance layer for a data assurance solution, in accordance with one embodiment of the present invention.

FIG. 3 illustrates a process 300 undertaken by the data assurance layer to construct a data assurance solution for a user in accordance with one embodiment of the present invention. For illustrative purposes only and not to be limiting thereof, the process 300 is discussed in the context of the data assurance layer 100 illustrated in FIG. 1 and data assurance for a server consolidation example.

At 310, the data assurance layer receives user-defined input data for data assurance. When a data user wishes to construct a data assurance solution, the user first provides the data assurance layer with one or more monitoring data sets on which the user desires to perform data assurance. In one embodiment, each input monitoring data set (metric data and metric metadata) may be electronically input into the data assurance layer 100. Thus, the data assurance layer 100 is to receive one or more user-defined or specified input data sets for data assurance. For the server consolidation example, a monitoring data set may include performance metrics for usage patterns of computing resources, such as CPU utilization and memory utilization of servers considered for consolidation, and network I/O utilization.

At 320, to invoke the data assurance service, the user may define or specify the desired data assurance/enrichment functions to be applied to the input data set(s). To do so, in one embodiment, the user provides the data assurance layer with the template 200 that has been customized for the user's specific data needs. This template specifies which of the one or more predetermined or user-defined data modules are to be used, the workflow describing the order in which they should be called, and their customization, including how data should flow through the modules, and the specific data assurance or enrichments to be performed by each data module. For those data modules defined by the user, they may be retained by the data assurance layer for subsequent use by other users. In another embodiment, the user provides the data assurance layer with the metrics required and the corrective actions that are to be applied should data imperfections be identified by the layer, and the layer automatically constructs the aforementioned template 200. Thus, the data assurance layer 100 is to receive user-defined or selected data assurance parameters or specifications for a data assurance workflow to be executed for the data assurance solution. For the server consolidation example, in one usage scenario, the user may specify which of the available data assurance functions or techniques to use for identifying data imperfections, such as missing or extra data in the performance metrics, time-misaligned data obtained from different servers considered for consolidation, and which of the available techniques to use to correct such data imperfections, which left unchecked may skew the server consolidation analysis. The available data assurance functions or techniques may be predefined by one or more experts in the data assurance field or users themselves (who also may be experts). In turn, the users are able to specify one or more available corrective actions to take for each type of imperfection that is identified.

At 330, the input data file(s) and user-defined workflow information are translated by the data translation module 120 into the data orchestration language to create a meta file. As described earlier, the meta file captures the following information: metric data and metric metadata of the input data set(s), the specific data modules to use and the order in which they are to be applied per the defined data assurance workflow, and the per-module customizations. Alternatively, the data assurance layer automatically constructs a template 200 from the parameters provided by the user and then translates such a template into a meta file.

At 340, the created meta file is fed (automatically or prompted by the user) into the orchestrator 140, which then parses the meta file to execute the workflow therein, invoking each data module as requires, and coordinates the data flow between the data modules to perform the data assurance service.

At 350, the data assurance layer 100 returns the results of the data assurance solution. For example, if the user defines or specifies desired data assurance functions for checking data imperfections and correcting such imperfections to generate cleansed data, the data assurance layer 100 is operable to return to the user a cleansed version of the input data set with annotations in the cleansed data set of the data quality and the corrected or cleansed data therein. For the server consolidation example, the cleansed data set may include fill-ins of missing data or deletion of extra data that initially were data imperfections. Furthermore, the cleansed data may be annotated to indicate where data has been added and the technique used (such as data interpolation) to derive the added data and to indicate where the extra data was removed. In one embodiment, the annotations are metadata flags, which report the type of imperfection found with a particular data point and the correction applied.

Accordingly, the process 300 allows a data user to have direct access to the data assurance layer 100 and to directly invoke the data assurance orchestrator 140 in the data assurance layer 100, which in turn invokes the data assurance modules (pre-defined or user-defined) for execution in accordance with the user-defined data assurance workflow.

Figure 4:
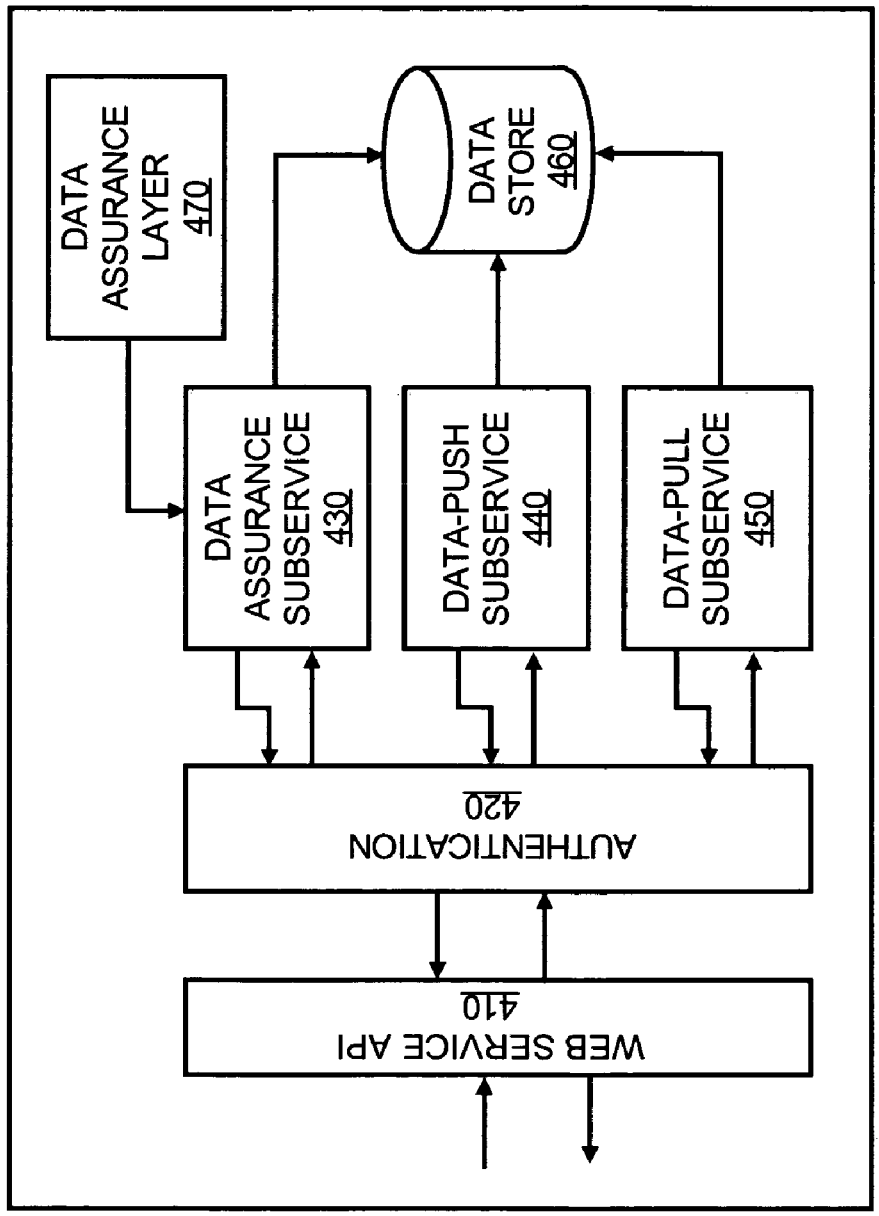
FIG. 4 illustrates a high-level system for providing a data assurance solution to a remote data user, in accordance with one embodiment of the present invention.

In another embodiment, a data user may make use of a data assurance service or tool provided by accessing a user interface (e.g., a Web interface) to the underlying data assurance layer. FIG. 4 illustrates a high-level system 400 for providing a data assurance solution to a remote data user, in accordance with such an embodiment. The system 400 includes one or more user interfaces, such as Web service Application Programming Interfaces (APIs) 410, that allow users to remotely access and define one or more input data sets for data assurance services, an authentication module 420 to authenticate the users as authorized to access the data assurance solution, a Data-Push subservice module 440 that allows users to input user-defined data sets to the system 400 on which data assurance can be performed, a data-pull subservice module 450 that allows the system 400 to retrieve user-defined data sets from a user-specified location, a data store 460 operable to store data input by users or retrieved from the users, a data assurance subservice module 430 that invokes the data assurance layer 470 providing it with the user provided data, and a data assurance layer 470 with similar architecture and operations to those of the architecture 100 in FIG. 1 for executing the user-defined workflows to provide data assurance solutions.

Figure 5:
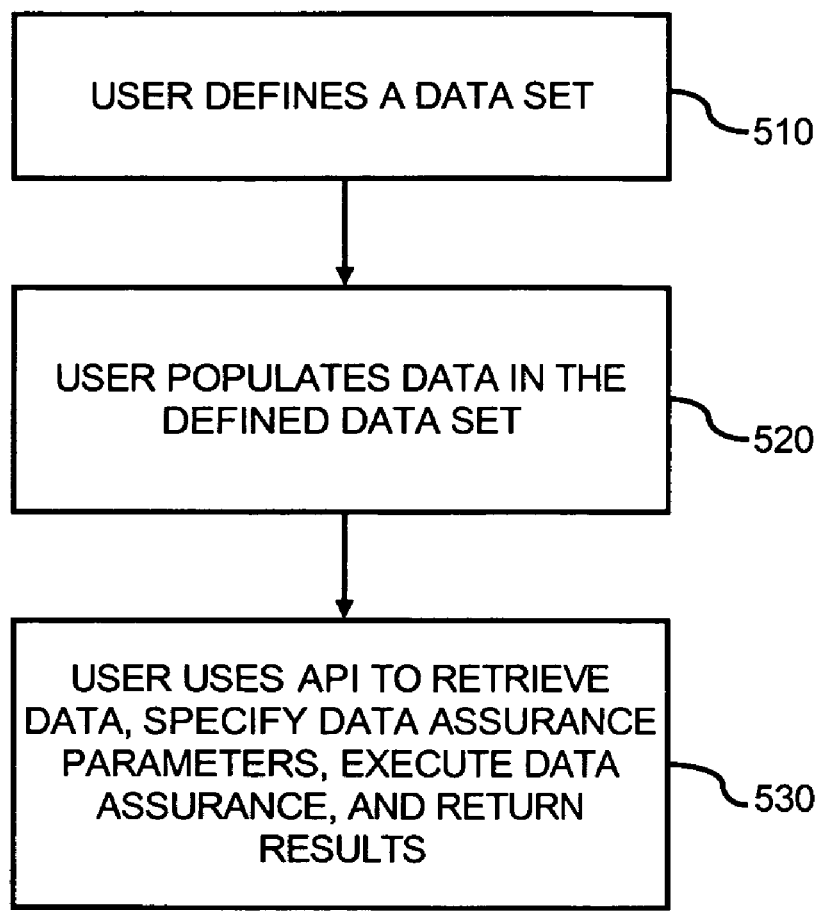
FIG. 5 illustrates a process for delivering a data assurance solution as a service to a remote data user, in accordance with one embodiment of the present invention.

FIG. 5 illustrates a process 500 for delivering a data assurance solution as a service to a remote data user. For illustrative purposes only and not to be limiting thereof, the process 500 is discussed in the context of the system 400 illustrated in FIG. 4.

Before a data user (human or tool) can construct a data assurance solution for one or more desired data set, the user needs to define and populate data for the desired one or more data sets. A data set definition specifies a name for the input data set and the set of metrics that belong to the input data set and their metric metadata. Thus, at 510, the user may access the system data assurance system 400 directly, via a public data network (e.g., Internet), or a private data network in order to use one or more available interfaces to define each data set for which the user desires data assurance services. FIG. 4 shows an example wherein the user may use a program or application, such as a Web browser, to access associated APIs, such as the web service application programming interfaces (APIs) 410, to define data sets. In one embodiment, the Web service APIs 410 include an API for initializing a data set to define properties for such a data set (hereinafter, "DefineDataSet API") and another API for modifying properties of an existing data set (hereinafter, "DataSetProperties API"). Thus, the data assurance layer 100 is to receive one or more user-defined data sets. Each user's call to a Web service API 410 is required to pass through the authentication module 420 to ensure that the user is authorized for employing such an API. Mechanisms for authenticating a user to a service are well known to those skilled in the art of service design and operation.

At 520, the user may employ one or more other interfaces, for example, in the Web service APIs, to populate a defined data set by writing data into a data storage in the system 400, such as the data store 460. For example, the Web service APIs 410 include an API (hereinafter, "Data-Push API") that may be called by the user to "push" or write data to a data set in the data store 460. When data is pushed to the system 400, a Data-Push subservice module 440 may be employed to receive the pushed data and write it into the data store 460. In an alternative embodiment, the user may populate a defined data set by providing the system 400 with sufficient information for the system 400 to retrieve the data itself. For example, the Web service APIs 410 include an API for setting up a process for the system 400 to retrieve data (hereinafter, "SetupData-Pull API") and another API for initiating the data pull (hereinafter, "ExecuteData-Pull API"). When data is pulled by the system 400, a Data-Pull subservice module 450 may be employed to access a remote data store (outside of the system 400) as specified by the user, retrieve data from the remote data store, and write it into the data store 460. The Web service APIs 410 may further include an API that may be called by the user to delete data from an existing data set (hereinafter, "DeleteData API"), an API for retrieving the last date written to a data set (hereinafter, "LastUpdateTimeStamp API"), an API for retrieving raw data from the data store (hereinafter, "QueryDataSet API"). Thus, the data assurance layer 100 is to receive metric data and metric metadata for populating the user-defined data set(s) for storage in the data store 460.

At 530, when the user desires a data assurance service to be performed on the stored data, the user may employ one or more other interfaces, for example, in the Web service APIs, to issue a request to perform the data assurance service. For example, the Web service APIs 410 include an API for retrieving the stored data, wherein the user is able to specify data assurance parameters in the API call, which then returns with the assured/enriched data, which may include flags embedded within the data indicating the data imperfections found, relevant context information, and the corrections applied, and an imperfection log (hereinafter, "RetrieveData API"). A data assurance subservice module 430 may then translate the user-specified data assurance parameters and stored data as retrieved from the data store 460 into a meta file of the data orchestration language for input to the data assurance layer 470, which then executes the workflow contained in the meta file in a similar manner to as described earlier with reference to FIG. 3 at 340. Alternatively, the translation may be done in a data translator module of the data assurance layer 470 in a similar manner to as described earlier with reference to FIG. 3 at 330. Once the workflow execution is completed, the data assurance subservice module 430 returns to the user the assured/enriched data, which may include flags embedded within the data indicating the data imperfections found, relevant context information, and the corrections applied, and a list of the data imperfections found in the data, as specified by the user's call to the RetrieveData API. In one embodiment, the user may create a custom data-reporting template, customize an existing data-reporting template, or augment an existing data-reporting template with additional functionality (as provided by new modules) for the data reporting.

Accordingly, the process 500 also allows a data user to provide a user-defined data assurance workflow that specifies the order in which the modules are to be executed and their customization. In one embodiment, the Web service APIs 410 also include an API for uploading the data assurance service to a new data module (hereinafter, "UploadNewModule API"). The data exchanged between the user and the data assurance subservice 430 or system 400 may be in any format. In one embodiment, the desired format is XML.

Figure 6:
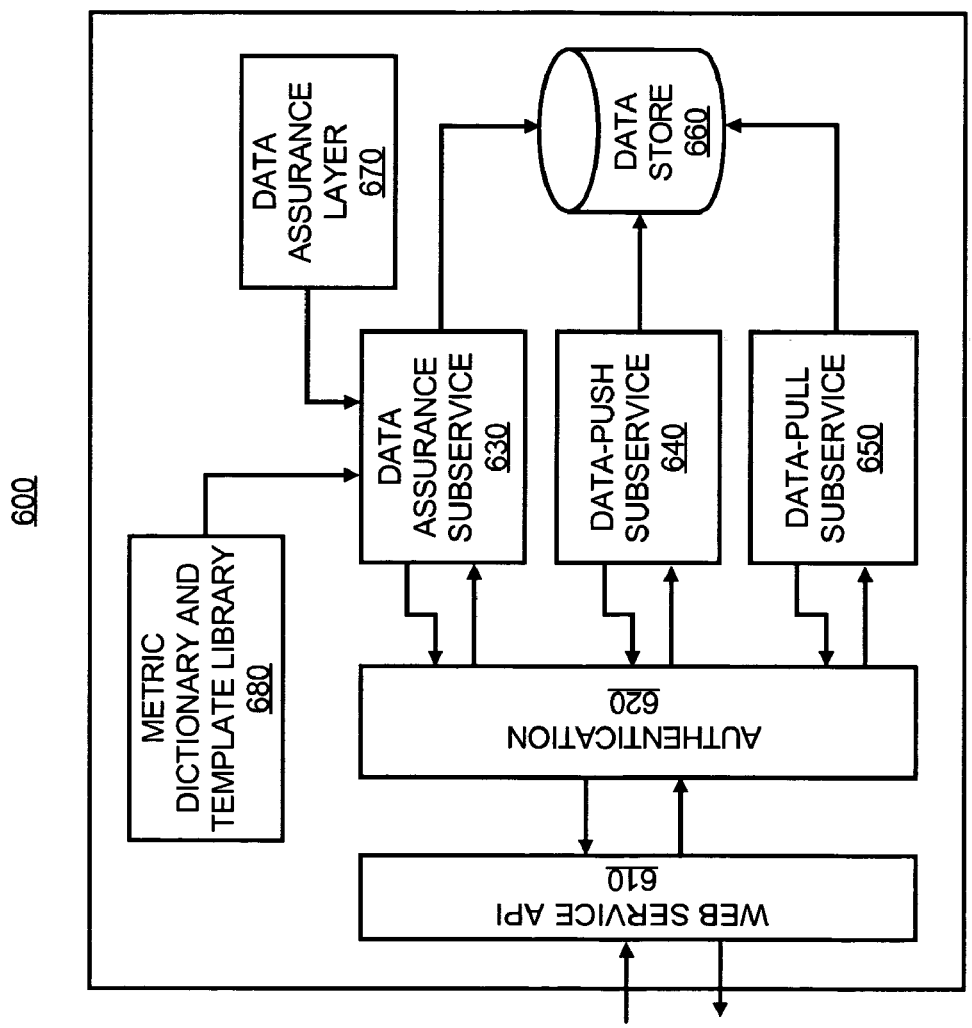
FIG. 6 illustrates a high-level system 600 for providing a data assurance solution to a remote data user, in accordance with another embodiment of the present invention.

FIG. 6 illustrates a high-level system 600 for providing a data assurance solution to a remote data user, whereby in addition to or in lieu of user-defined data assurance workflows, the system 600 may itself construct a workflow using as inputs: a dictionary describing the properties of the metrics and their relationships, and a library of customizable workflow templates. Thus, in one embodiment, the system 600 is the system 400 with the addition of a metric dictionary and template library module 680 for storing the aforementioned dictionary and library. Alternatively, there is provided a metric dictionary module and a separate workflow template library module.

Figure 7:
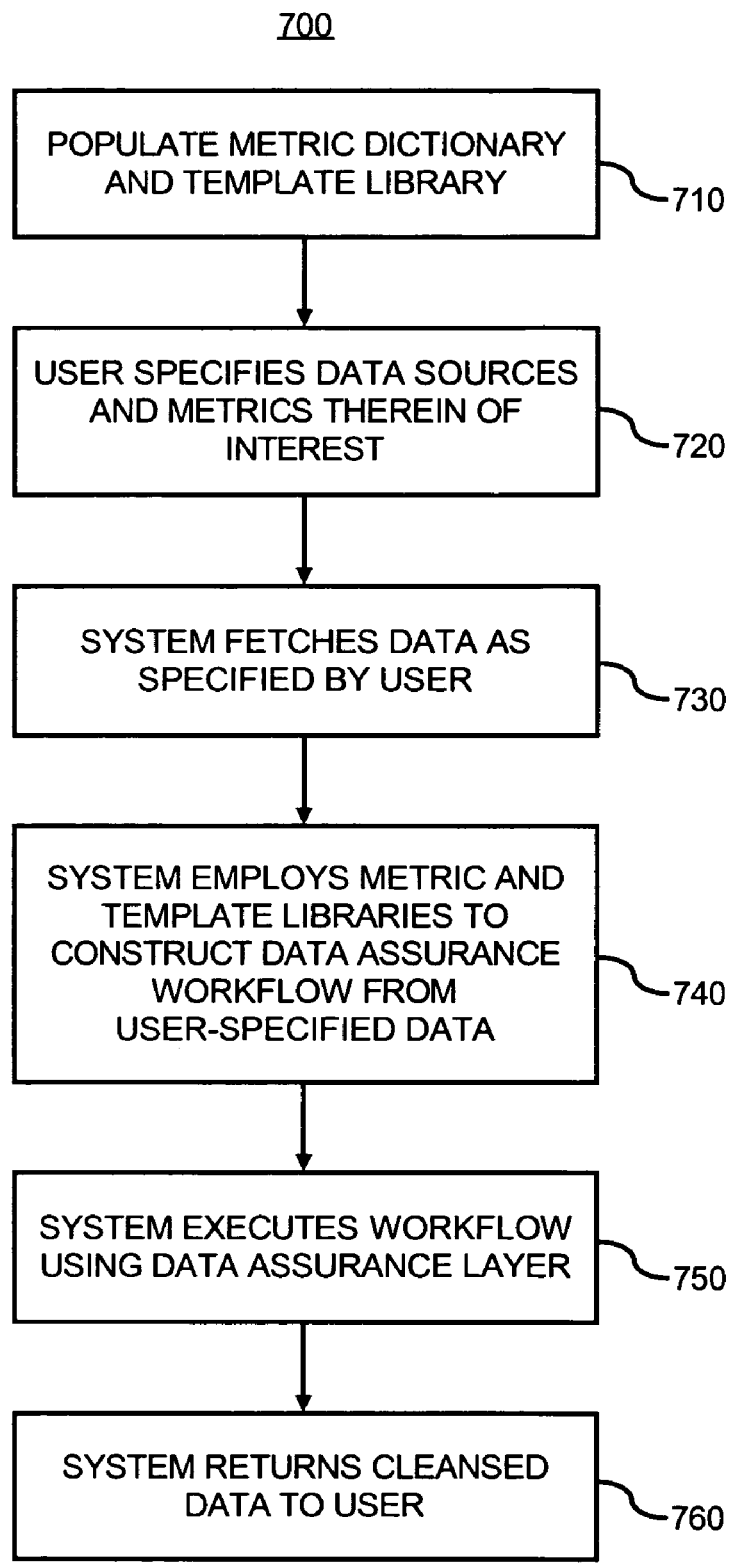
FIG. 7 illustrates a process for delivering a data assurance service to a remote data user, in accordance with still another embodiment of the present invention.

FIG. 7 illustrates a process 700 for providing a data assurance service to a remote data user. For illustrative purposes only and not to be limiting thereof, the process 700 is discussed in the context of the system 600 illustrated in FIG. 6.

At 710, the metric dictionary and template library 680 is populated with metrics, their properties, and their relationships to one another and customizable workflow templates. This information may be accrued from experts in desired data management and analysis fields, such as experts in the resource allocation and capacity management fields if the user intends on using the offered data assurance services for resource allocation and capacity management tools.

At 720, the user may call on one or more interfaces, such as one in the Web service APIs 610 to specify one or more data sources for the data of interest and the specific metrics of interest to fetch (hereinafter, "SetupData-Pull API").

At 730, the system 600 may automatically call one or more other interfaces, such as one in the Web service APIs 610 to use the user-specified information to determine the data that must be fetched from the one or more data sources and fetch the data for storage in the data store 660 (hereinafter, "ExecuteData-Pull API").

At 740, the system 600 automatically invokes the data assurance subservice module 630, which accesses the data store 660 to retrieve the user-specified information, retrieves necessary information about the metrics contained in the user-specified information and an appropriate workflow template from the dictionary/library module 680 (as pre-selected by the user or automatically selected based on past dealings with the user, or as specified by an IT administrator or expert), and constructs a workflow in a meta file based on the retrieved information.

At 750, the system 600 then executed the constructed workflow in the data assurance layer 670 in a manner similar to as described earlier with reference to FIG. 3 at 330 and 340 (for translation to a meta file at the data assurance layer) or at 340 (for translation to a meta file at the data assurance subservice module 630).

At 760, once the workflow execution is completed, the data assurance subservice module 630 returns to the user the cleansed data, , which may include flags embedded within the data indicating the data imperfections found, relevant context information, and the corrections applied, and a list of the data imperfections found in the data. Again, in one embodiment, the user may create a custom data-reporting template, customize an existing data-reporting template, or augment an existing data-reporting template with additional functionality (as provided by new modules) for the data reporting.

Accordingly, process 700 provides automation of the data assurance service or solution once the user provides the data sources and metrics therein that are of interest for retrieval and data assurance services.

Figure 8:
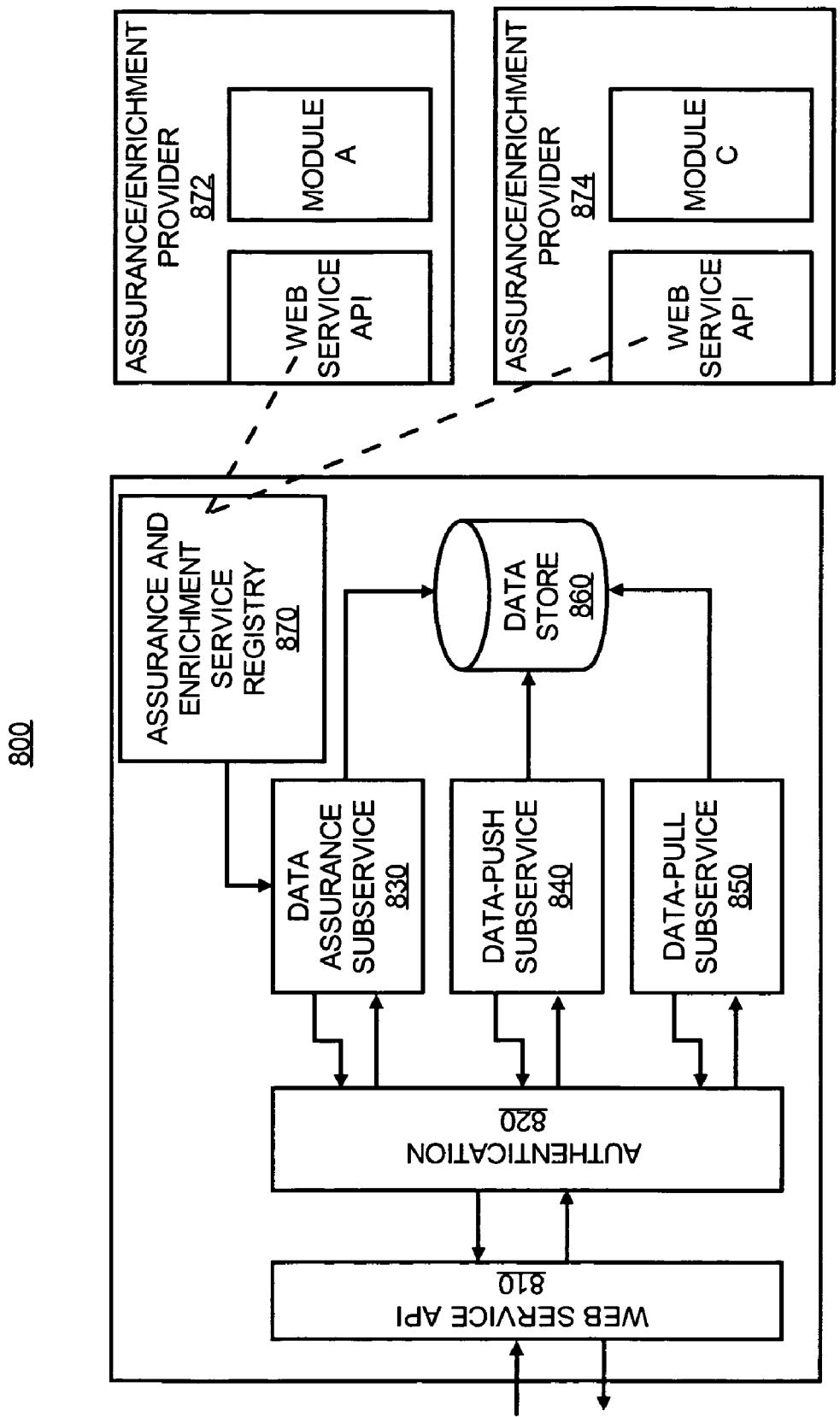
FIG. 8 illustrates a high-level system 800 for providing a data assurance solution to a remote data user, wherein the system 800 may leverage external providers of data assurance and enrichment functions.

FIG. 8 illustrates a high-level system 800 for providing a data assurance solution to a remote data user, wherein the system 800 may leverage external providers of data assurance and enrichment functions. In FIG. 8, the system 800 is identical to the system 400, except for the replacement of a data assurance layer with a new data assurance and enrichment service registry 870. In one embodiment, the data assurance subservice module 830 is responsible for orchestrating the use of the external assurance/enrichment providers 872 and 874. Using the assurance and enrichment service registry to identify and locate the providers 872 and 874, the data assurance subservice module 830 sends to each of these providers 872 and 874 a request to process the required monitoring data with data modules provided by the same providers, and receiving in return from the same providers the processed data for the user. If a provider is unable to respond quickly, it issues an acknowledgement and then later returns the requested information. In one embodiment, each provider reads the data required to service the request from the data store 860 as facilitated by the data assurance subservice 830 and writes its results to the same data store 860. This reading/writing may be done using the data query and data push APIs described earlier. Accordingly, the data assurance layer may extend to include data modules from multiple different entities or locations.

Figure 9:
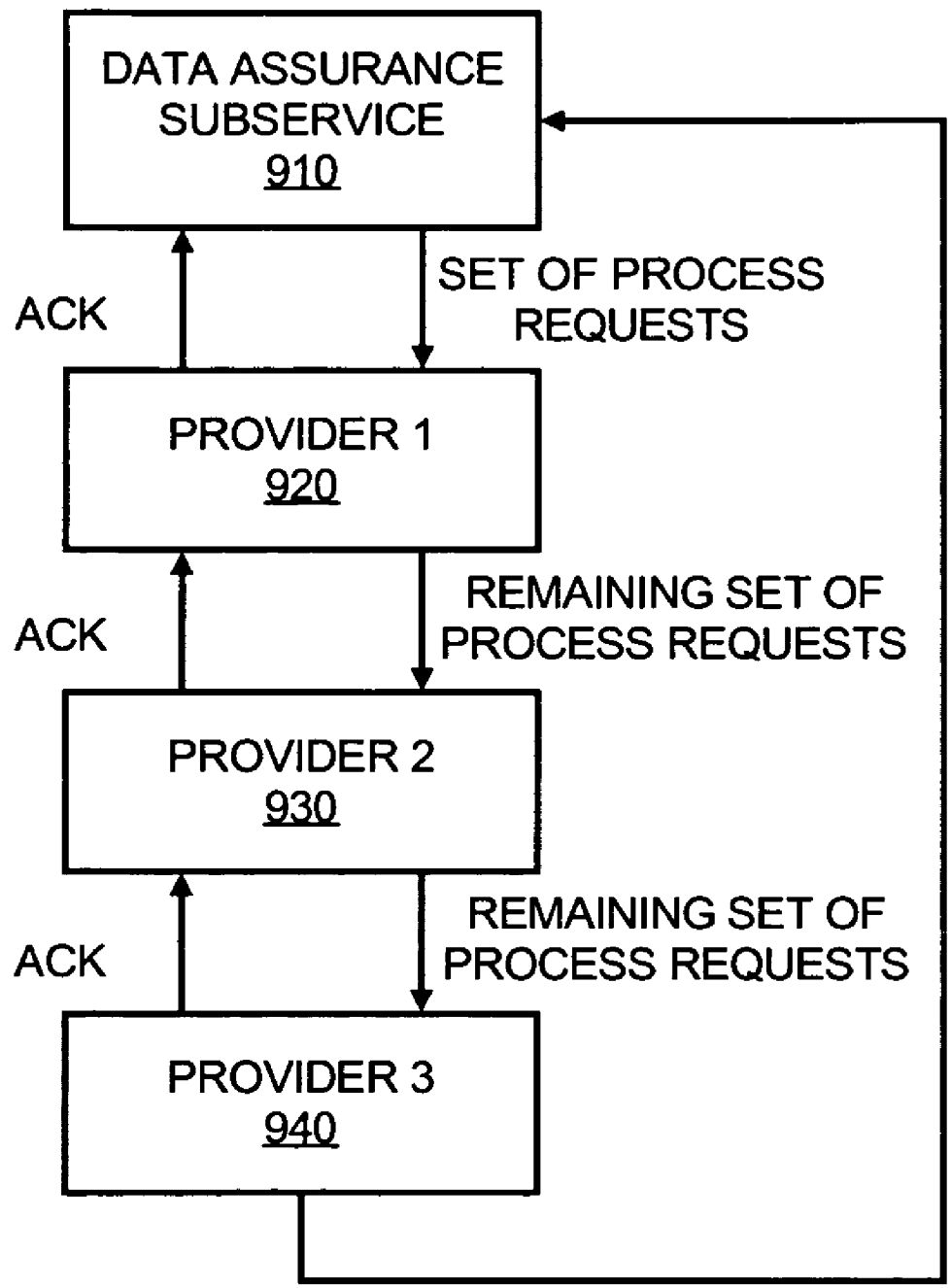
FIG. 9 illustrates an interaction between external data assurance providers to provide data assurance services, in accordance with one embodiment of the present invention.

In one embodiment, the data assurance service provided by the system 800 provides the required data as part of the initial request and each provider returns the processed data as part of the final response. For example, if a provider is unable to respond quickly, it issues an acknowledgement and then later returns the requested information. In still another embodiment, as illustrated in FIG. 9, only the first and last providers 920 and 940 that are used interact directly with the data assurance subservice 910 (corresponding to 830 in FIG. 8) while an intermediate one, 930, interacts with the provider 920 immediately before it and after it, 940, in the pipeline.

According to another embodiment, any one of the data assurance services or tools described above may be used to identify imperfections in the monitoring tools (e.g., data collectors) and not to cleanse such imperfections. As such, this embodiment may be used by developers of monitoring tools to assess whether the tools are functioning correctly. The service may be used as part of an "in-house" qualification process or deployed to customer sites wherein the service is operable to alert the developers to data imperfections as they occur (rather than waiting for a support call from the customer). In this embodiment, the data assurance checks performed by the service are specified by the developers; no data correction actions or enrichments are performed. As such the service is operable in a "read-only" mode to enable proactive rather than reactive improvements to data collection products.

Figure 10:
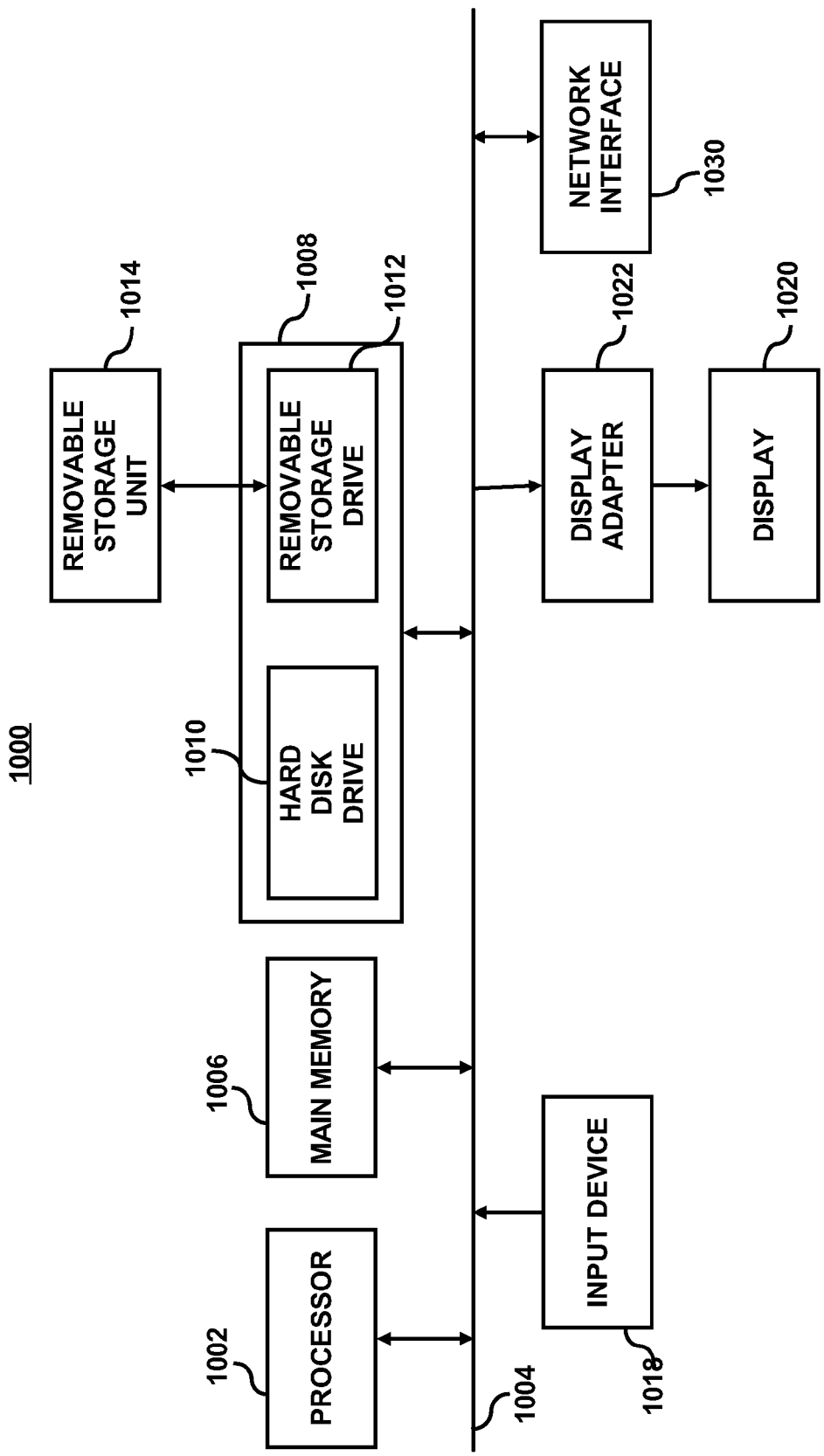
FIG. 10 illustrates a block diagram of a computerized system 1000 for implementing a data assurance layer or any system having a data assurance layer therein, in accordance with one embodiment of the present invention.

FIG. 10 illustrates a block diagram of a computerized system 1000 that is operable to be used as a platform for implementing any of the data assurance layers 100, 470, or 670 in FIGS. 1, 4, and 6, respectively. The computerized system 1000 is also operable to be used as a platform for implementing the systems 400, 600, and 800 in FIGS. 4, 6, and 8, respectively. It should be understood that a more sophisticated computerized system is operable to be used. Furthermore, components may be added or removed from the computerized system 1000 to provide the desired functionality.

The computer system 1000 includes one or more processors, such as processor 1002, providing an execution platform for executing software. Thus, the computerized system 1000 includes one or more single-core or multi-core processors of any of a number of computer processors, such as processors from Intel, Motorola, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 1002 are communicated over a communication bus 1004. The computer system 1000 also includes a main memory 1006 where software is resident during runtime, and a secondary memory 1008. The secondary memory 1008 may also be a computer-readable medium (CRM) that may be used to store the software programs, applications, or modules that implement one or more components of a data assurance layer 100, 470, or 670 or one or more components of the systems 400, 600, and 800. The main memory 1006 and secondary memory 1008 (and an optional removable storage unit 1014) each includes, for example, a hard disk drive and/or a removable storage drive 1012 representing a floppy diskette drive, a magnetic tape drive, a compact disk drive, etc., or a nonvolatile memory where a copy of the software is stored. In one example, the secondary memory 1008 also includes ROM (read only memory), EPROM (erasable, programmable ROM), EEPROM (electrically erasable, programmable ROM), or any other electronic, optical, magnetic, or other storage or transmission device providing a processor or processing unit with computer-readable instructions. The computer system 1000 includes a display 1020 connected via a display adapter 1022, user interfaces comprising one or more input devices 1018, such as a keyboard, a mouse, a stylus, and the like. However, the input devices 1018 and the display 1020 are optional. A network interface 1030 is provided for communicating with other computer systems.

What has been described and illustrated herein is an embodiment along with some of its variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for providing data assurance, comprising:
   receiving selected input data to perform data assurance;
   receiving selected parameters for the data assurance;
   providing a plurality of data assurance modules for performing the data assurance;
   deriving a workflow for the data assurance based on the selected input data and the selected parameters for the data assurance; and
   a computer system executing the workflow to perform the data assurance on the selected input data with at least one of the plurality of provided data assurance modules.

2. The method of claim 1, wherein receiving selected parameters for the data assurance comprises:
   receiving a selection of the at least one data assurance module for executing the workflow; and
   receiving a customization of the at least one data assurance module.

3. The method of claim 1, wherein providing the plurality of data assurance modules comprises providing at least one of:
   a correlation module for testing known relationships between data elements in the selected input data;
   a range test module for testing whether a data element in the selected input data is within a predetermined range;
   a time check module for testing whether a plurality of data elements in the selected input data occur at predetermined time intervals;
   a missing and extra data module for testing whether there is missing an expected data element in the selected input data; and
   a statistical similarity module for testing whether the selected input data is statistically similar to a previously-received input data.

4. The method of claim 1, wherein providing the plurality of data assurance modules comprises providing at least one of:
   a merge module for merging data elements in the selected input data together;
   a statistics module for computing summary statistics of the selected input data;
   a projection module for projecting the selected input data forward in time to account for anticipated change in values of the selected input data due to one or more future occurrences.

5. The method of claim 1, further comprising:
   providing a cleansed version of the selected input data with annotations therein to indicate a data quality of the selected input data and corrected data elements in the selected input data.

6. The method of claim 1, further comprising:
   defining a data orchestration language for performing a data assurance layer; and
   translating the selected input data and the selected parameters for the data assurance into a meta file of the defined data orchestration language, the translating comprises:
      providing attributes in the meta file for executing the workflow;
      providing definitions of data elements in the selected input data; and
      providing an attachment of the selected input data.

7. The method of claim 6, wherein translating the selected input data and the selected parameters for the data assurance into a meta file further comprises:
   providing a listing of at least two of the plurality of data assurance modules in the meta file, the order of the at least two data assurance modules in the listing indicates the same order for executing the at least two data assurance modules in the workflow.

8. The method of claim 7, wherein providing a list of at least two of the plurality of data assurance modules comprises:
   providing tasks in one of the at least two data assurance modules to be performed by the at least one data assurance module upon executing the workflow.

9. The method of claim 1, wherein executing the workflow comprises:
   checking the selected input data for a data imperfection;
   correcting the data imperfection;
   providing a correction version of the data imperfection with an annotation of the correcting.

10. The method of claim 1, wherein receiving the selected input data comprises:
    receiving metrics of a computing environment and monitored values of the metrics.

11. The method of claim 10, wherein executing the workflow to perform the data assurance comprises:
    the at least one data assurance module generating metadata for the metrics, the metadata includes a detected data imperfection in one of the monitored values of the metrics, and a type of the detected data imperfection.

12. A system for providing data assurance, comprising:
    a data assurance layer that includes,
       a) a first translator executed by a processor and is operable to translate input data subject to a data assurance into a predefined data orchestration language;
       b) a plurality of data assurance modules executed by the processor and include at least two of,
          a correlation module for testing known relationships between data elements in the input data;
          a range test module for testing whether a data element in the input data is within a predetermined range;
          a time check module for testing whether a plurality of data elements in the input data occur at predetermined time intervals;
          a missing data module for testing whether there is missing an expected data element in the input data;
          an extra data module for testing whether there is an unexpected redundant data element in the input data;

a statistical similarity module for testing whether the input data is statistically similar to a previously-received input data;

a merge module for merging data elements in the input data together;

a statistics module for computing summary statistics of the input data; and a projection module for projecting the input data forward in time to account for anticipated change in values of the input data due to one or more future occurrences; and c) an orchestrator module executed by the processor and is operable to parse at least the input data in the predefined data orchestration language into a workflow, and the workflow is executed to perform the data assurance of the input data.

13. The system of claim 12, wherein the data assurance layer further comprises:

a second translator operable to translate results of the data assurance into a user-defined format.

14. The system of claim 12, further comprising:

a data-push subservice module operable to provide a user with access to provide the input data to the system;

a plurality of interfaces operable to provide the user with access to the data-push subservice module, the plurality of interfaces include at least one of, a first interface operable to receive properties to initialize a data set for the input data;

a second interface operable to receive a modification to an existing property of the data set;

a third interface operable to populate the data set with the input data; and a fourth interface operable to delete existing data in the data set.

15. The system of claim 14, wherein the data-push subservice module and the plurality of interfaces belong to a predefined subsystem that is a part of the data assurance layer.

16. The system of claim 15, wherein the predefined subsystem further includes:

a registry identifying the data assurance layer from a plurality of data assurance layers provided by a provider external to the predefined subsystem.

17. The system of claim 12, further comprising:

a data-pull subservice module operable to retrieve the input data from at least one source external to the system;

a plurality of interfaces operable to provide a user with access to the data-pull subservice module, the plurality of interfaces include at least one of, a first interface operable to set up a retrieval process to retrieve the input data from at least one source external to the system; and a second interface operable to execute the retrieval process.

18. The system of claim 12, further comprising:

a metric dictionary module storing information about metrics for the input data, properties of the metrics, and relationships among the metrics.

19. The system of claim 12, further comprising:

a workflow template library module storing a plurality of predetermined workflow templates for automatic selection and execution by the orchestrator module based at least on the input data.

20. A computer readable medium on which is stored program code that when executed by a computer system performs a method comprising:

defining a data orchestration language for performing a data assurance;

receiving selected input data to perform the data assurance;

receiving selected parameters for the data assurance;

providing a plurality of data assurance modules for performing the data assurance;

translating the selected input data and the selected parameters for the data assurance into a meta file of the defined data orchestration language;

parsing the meta file to derive a workflow for the data assurance; and executing the workflow to perform the data assurance on the selected input data with at least one of the plurality of provided data assurance modules.

* * * * *

UNITED STATES PATENT AND TRADEMARK OFFICE
CERTIFICATE OF CORRECTION

| | |
|---|---|
| PATENT NO. | : 7,571,069 B1 |
| APPLICATION NO. | : 11/644168 |
| DATED | : August 4, 2009 |
| INVENTOR(S) | : Keith Istvan Farkas et al. |

It is certified that error appears in the above-identified patent and that said Letters Patent is hereby corrected as shown below:

On the Title page, in field (75), Inventors, in column 1, line 1, delete "Keith Istyan Farkas," and insert -- Keith Istvan Farkas, --, therefor.

Signed and Sealed this

Fourth Day of May, 2010

David J. Kappos
*Director of the United States Patent and Trademark Office*